(12) United States Patent
Oh

(10) Patent No.: US 6,366,329 B1
(45) Date of Patent: Apr. 2, 2002

(54) PROJECTION TYPE VIDEO DISPLAY APPARATUS USING A PROGRESSIVE SCANNING MODE

(75) Inventor: Ji-Byoung Oh, Suwon (KR)

(73) Assignee: SamSung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/329,295

(22) Filed: Jun. 10, 1999

(30) Foreign Application Priority Data

Jun. 13, 1998 (KR) .......................................... 98-22158

(51) Int. Cl.$^7$ .............................. H04N 3/22; H04N 5/46
(52) U.S. Cl. ...................... 348/744; 348/448; 348/554; 348/745
(58) Field of Search ................................ 348/448, 449, 348/452, 458, 745, 746, 747, 744, 554, 555, 556, 558; H04N 3/22, 3/23, 3/26, 3/27, 3/223, 3/227, 5/46, 5/64, 7/01, 9/31, 11/20

(56) References Cited

U.S. PATENT DOCUMENTS

| | | | | |
|---|---|---|---|---|
| 4,739,390 A | * | 4/1988 | Achiha et al. ................. 358/11 |
| 5,461,427 A | * | 10/1995 | Duffield et al. ............. 348/555 |
| 5,475,442 A | * | 12/1995 | Matsushita et al. ......... 348/554 |
| 5,592,230 A | * | 1/1997 | Yoshino ....................... 348/448 |
| 5,610,661 A | * | 3/1997 | Bhatt .......................... 348/448 |
| 5,742,353 A | * | 4/1998 | Yasuki et al. ................ 348/452 |
| 5,784,116 A | * | 7/1998 | Pan et al. .................... 348/448 |
| 5,838,381 A | * | 11/1998 | Kasahara et al. ........... 348/458 |
| 5,978,041 A | * | 11/1999 | Masuda et al. .............. 348/563 |
| 5,990,982 A | * | 11/1999 | Gove et al. .................. 348/448 |
| 6,100,926 A | * | 8/2000 | Kawashima ................. 348/745 |
| 6,144,412 A | * | 11/2000 | Hirano et al. ............... 348/556 |
| 6,204,884 B1 | * | 3/2001 | Lee .............................. 348/555 |

* cited by examiner

*Primary Examiner*—Michael H. Lee
*Assistant Examiner*—Brian P. Yenke
(74) *Attorney, Agent, or Firm*—Robert E. Bushnell, Esq.

(57) ABSTRACT

A projection type video display apparatus prevents resolution of a screen from decreasing by converting a video signal of an interlaced scanning mode received from an outside source to a video signal of a progressive scanning mode. A signal selecting section outputs one of a plurality of video signals received from the outside source in response to a control signal from a control section. A progressive scanning conversion section converts the video signal from the signal selecting section to a video signal of the progressive scanning mode in response to a control signal from the control section. When the video signal from the progressive scanning conversion section is amplified as a red-green-blue signal by means of a cathode-ray tube driving section, a progressive convergence section outputs a progressive convergence signal in order to minimize a difference between incidence angles of each of the red, green and blue components of the red-green-blue signal in response to a control signal from the control section. A cathode-ray tube outputs the red-green-blue signal from the cathode-ray tube driving section in response to the progressive convergence signal. A control section outputs control signals to the signal selecting section, progressive scanning conversion section and progressive convergence section, respectively. Accordingly, a decrease in the resolution of the video displayed on a screen is prevented.

23 Claims, 3 Drawing Sheets

PROJECTION TYPE VIDEO DISPLAY APPARATUS USING A PROGRESSIVE SCANNING MODE

CLAIM OF PRIORITY

This application makes reference to, incorporates the same herein, and claims all benefits accruing under 35 U.S.C. §119 from an application for PROJECTION TYPE VIDEO DISPLAY APPARATUS USING A PROGRESSIVE SCANNING MODE earlier filed in the Korean Industrial Property Office on the 13$^{th}$ of June 1998 and there duly assigned Ser. No. 22158/1998.

BACKGROUND OF THE INVENTION

1. Technical Field

The present invention relates to a projection type video display apparatus and, more particularly, to a projection type video display apparatus using a progressive scanning mode. The apparatus is capable of preventing resolution of a screen from decreasing by means of converting a video signal of an interlaced scanning mode, inputted from an external source, to a video signal of a progressive scanning mode.

2. Description of the Prior Art

Currently, a projection type video display apparatus is broadly used as an apparatus for displaying a video signal inputted from an external source (that is, a video signal for a television or from a video cassette recorder) on a wide screen. Such projection type video display apparatus, in general, displays a video signal on the wide screen with a liquid crystal display or a cathode-ray tube.

However, the projection type video display apparatus which uses a cathode-ray tube to display the video on the wide screen with three pixels called red, green and blue adopts an interlaced scanning mode as the mode for displaying the video.

As a result, if the size of the video being displayed on the wide screen is enlarged or the watching distance is decreased, resolution of the video decreases because of the roughness of the video being displayed on the wide screen. Additionally, the projection type video display apparatus described above needs another encoding device in order to display video received from a computer system. Accordingly, the projection type video display apparatus has to adopt a flicker filter to remove a flickering phenomenon which occurs when an encoded signal from the encoding device is converted to a red-green-blue signal. However, when the projection type video display apparatus has to adopt the flicker filter, the resolution of the video decreases due to distortion of the video signal.

SUMMARY OF THE INVENTION

Therefore, it is an object of the present invention to provide a projection type video display apparatus using a progressive scanning mode, which is capable of preventing resolution of a screen from decreasing by converting a video signal of an interlaced scanning mode, inputted from an external source, to a video signal of a progressive scanning mode.

In order to achieve the above object, the present invention provides a projection type video display apparatus using a progressive scanning mode, which comprises: signal selecting means for receiving a plurality of video signals from an external source and for outputting one of the plurality of video signals in response to a first control signal; progressive scanning conversion means for converting the video signal from the signal detecting means to a video signal of a progressive scanning mode in response to a second control signal; cathode-ray tube driving means for amplifying the video signal converted by the progressive scanning conversion means to output a red-green-blue signal; progressive convergence means, responsive to a third control signal, for outputting a progressive convergence signal for minimizing a difference between incidence angles of each of the red, green and blue components of the red-green-blue signal outputted from the cathode-ray tube driving means; a cathode-ray tube for outputting the red-green-blue signal from the cathode-ray tube driving means to a user in response to the progressive convergence signal; and control means for supplying the first control signal to the signal selecting means in response to a selection control signal from the user in order to select the video signal, for supplying the second control signal to the progressive scanning conversion means in order to convert the video signal from the signal selecting means to the video signal of the progressive scanning mode, and for supplying the third control signal to the progressive convergence means.

In order to achieve the above object, the present invention provides a projection type video display apparatus using a progressive scanning mode, which comprises: television signal processing means for receiving a television signal from an external source, for separating a video signal from the television signal, for amplifying the separated video signal, and for supplying the amplified video signal to the signal selecting means; computer signal processing means for receiving a computer video signal from the external source, and for converting the computer video signal to a video signal of an interlaced scanning mode in response to a first control signal; signal selecting means for receiving the television video signal, the computer video signal and an external video signal from said television signal processing means, the computer signal processing means and the external source, respectively, and for outputting one of the television video signal, the computer video signal and the external video signal in response to a second control signal; progressive scanning conversion means for converting the video signal outputted from the signal selecting means to a video signal of a progressive scanning mode in response to a third control signal; cathode-ray tube driving means for amplifying the video signal from the progressive scanning conversion means to a red-green-blue signal; progressive convergence means, responsive to a fourth control signal, for outputting a progressive convergence signal to minimize a difference between incidence angles of each of the red, green and blue components of the red-green-blue signal outputted from the cathode-ray tube driving means; a cathode-ray tube for outputting the red-green-blue signal from the cathode-ray tube driving means to a user in response to the progressive convergence signal; and control means for supplying the first control signal to the computer signal processing means in order to convert the computer video signal to a video signal of the interlaced scanning mode, for supplying the second control signal to the signal selecting means in order to select the video signal in response to a selection control signal from the user, for supplying the third control signal to said progressive scanning conversion means in order to convert the video signal from the signal selecting means to the video signal of the progressive scanning mode, and for supplying the fourth control signal to the progressive convergence means.

In order to achieve the above object, the present invention provides a projection type video display apparatus using a progressive scanning mode, which comprises: signal detecting means for receiving a plurality of video signals from an external source and for outputting one of the plurality of video signals in response to a first control signal; progressive scanning conversion means for converting the video signal from the signal detecting means to a video signal of a progressive scanning mode in response to a second control signal; computer signal processing means for receiving a computer video signal from the external source and for converting the computer video signal to a video signal of the progressive scanning mode in response to a third control signal; video signal selecting means, responsive to a fourth control signal, for outputting one of the video signal of the progressive scanning mode and the computer video signal inputted from the progressive scanning conversion means and the computer signal processing means, respectively; cathode-ray tube driving means for amplifying the video signal from the video signal selecting means to a red-green-blue signal; progressive convergence means, responsive to a fifth control signal, for outputting a progressive convergence signal for minimizing a difference between incidence angles of each of the red, green and blue components of the red-green-blue signal outputted from the cathode-ray tube driving means; cathode-ray tube for outputting the red-green-blue signal from the cathode-ray tube driving means to a user in response to the progressive convergence signal; and control means for supplying the first control signal for selecting the video signal to the signal selecting means in response to a selection control signal from the user, for supplying the second control signal to the progressive scanning conversion means in order to convert the video signal from the signal selecting means to the video signal of the progressive scanning mode, for supplying the third control signal to the computer signal processing means in order to convert the computer video signal to the video signal of the progressive scanning mode, for supplying the fourth control signal to the video signal selecting means in order to select one of the video signal and the computer video signal outputted from the progressive scanning conversion means and the computer signal processing means, respectively, and for supplying the fifth control signal to said progressive convergence means.

In the projection type video display apparatus according to the present invention as described above, the video signal of the interlaced scanning mode, inputted from the external source (such as a video cassette recorder or computer system), is displayed after the scanning mode is converted to the progressive scanning mode. Accordingly, it is able to prevent the resolution of the screen from decreasing.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

A description will be given below in detail with reference to the accompanying drawings to a configuration and an operation of a projection type video display apparatus using a progressive scanning mode according to an embodiments of the present invention.

Figure 1:
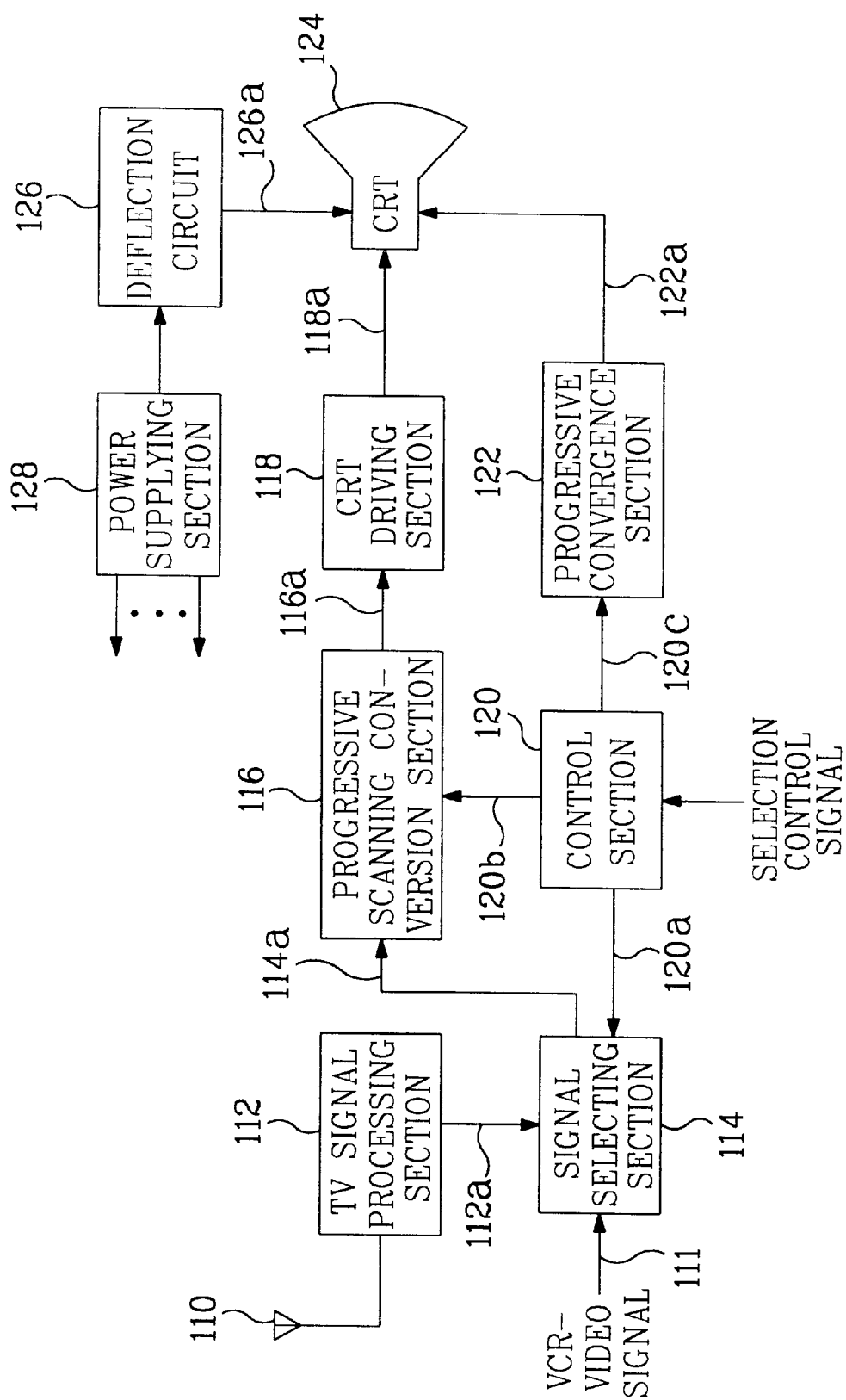
FIG. 1 is a block diagram showing the configuration of a projection type video display apparatus using a progressive scanning mode according to a first embodiment of the present invention.

FIG. 1 is a block diagram showing the configuration of a projection type video display apparatus using a progressive scanning mode according to a first embodiment of the present invention.

Referring to FIG. 1 the projection type video display apparatus using the progressive scanning mode according to the first embodiment of the present invention comprises: a television signal processing section 112 connected to an antenna 110 for separating a television video signal 112a from a radio frequency signal (hereinafter, referred to as an RF signal); a signal selecting section 114 for selectively outputting either television video signal 112a or an external video signal 111 inputted from a video cassette recorder (not shown) in response to a first control signal 120a; a progressive scanning conversion section 116 for converting a video signal 114a from signal selecting section 114 to a video signal 116a of a progressive scanning mode in response to a second control signal 120b; a cathode-ray tube driving section (hereinafter, referred to as a CRT driving section) 118 for amplifying video signal 116a from progressive scanning conversion section 116, and for outputting a red-green-blue signal (hereinafter, referred to as R-G-B signal) 118a; a progressive convergence section 122, responsive to a third control signal 120c, for outputting a progressive convergence signal 122a in order to minimize a difference between incidence angles of each of the red, green and blue components of R-G-B signal 118a, a control section 120 for supplying first, second and third signals 120a, 120b and 120c, respectively, to signal selecting section 114, progressive scanning conversion section 116 and progressive convergence section 122 respectively; a deflection circuit 126 for outputting horizontal and vertical deflection signals (hereinafter, referred to as H/V deflection signals) 126a; a cathode-ray tube 124 for displaying R-G-B signal 118a from CRT driving section 118 in response to H/V deflection signals 126a and progressive convergence signal 122a; and a power supplying section 128 for supplying power to the respective elements of the projection type video display apparatus.

In operation, when the RF signal is received via antenna 110, television signal processing section 112 separates television video signal 112a from the RF signal, amplifies television video signal 112a with a tuner, an intermediate-frequency amplifier and a video detector (not shown) installed in television signal processing section 112, and supplies television video signal 112a to signal selecting section 114.

Control section 120, responsive to a selection control signal generated by a user, supplies first, second and third control signals 120a, 120b and 120c, respectively, to signal selecting section 114, progressive scanning conversion section 116 and progressive convergence section 122, respectively.

Signal selecting section 114 receives television video signal 112a from television signal processing section 112 and external video signal 111 from the video cassette recorder or VCR (not shown), and outputs one of television video signal 112a and external video signal 111, as video signal 114a, in response to first control signal 120a. At this point, video signal 114a outputted from signal selecting section 114 is a video signal of an interlaced scanning mode.

Next, progressive scanning conversion section 116 converts video signal 114a from signal selecting section 114 to video signal 116a of the progressive scanning mode in response to second control signal 120b from control section 120.

CRT driving section 118 amplifies video signal 116a received from progressive scanning conversion section 116, and supplies R-G-B signal 118a to cathode-ray tube 124.

At this point, progressive convergence section 122 responds to third control signal 120c, and supplies progressive convergence signal 122a to cathode-ray tube 124 in order to minimize the difference between incidence angles of each of the R, G and B components of R-G-B signal 118a outputted from CRT driving section 118.

In addition, deflection circuit 126 supplies H/V deflection signals 126a to cathode-ray tube 124 in order to deflect R-G-B signal 118a, which is supplied from CRT driving section 118 to cathode-ray tube 124, in the horizontal and vertical directions.

Cathode-ray tube 124 is responsive to progressive convergence signal 122a and H/v deflection signals 126a which are inputted from progressive convergence section 122 and deflection circuit 126, respectively, and displays R-G-B signal 118a from CRT driving section 118 in accordance with minimization of the difference between the incidence angles of each of the R, G and B components of R-G-B signal 118a.

Figure 2:
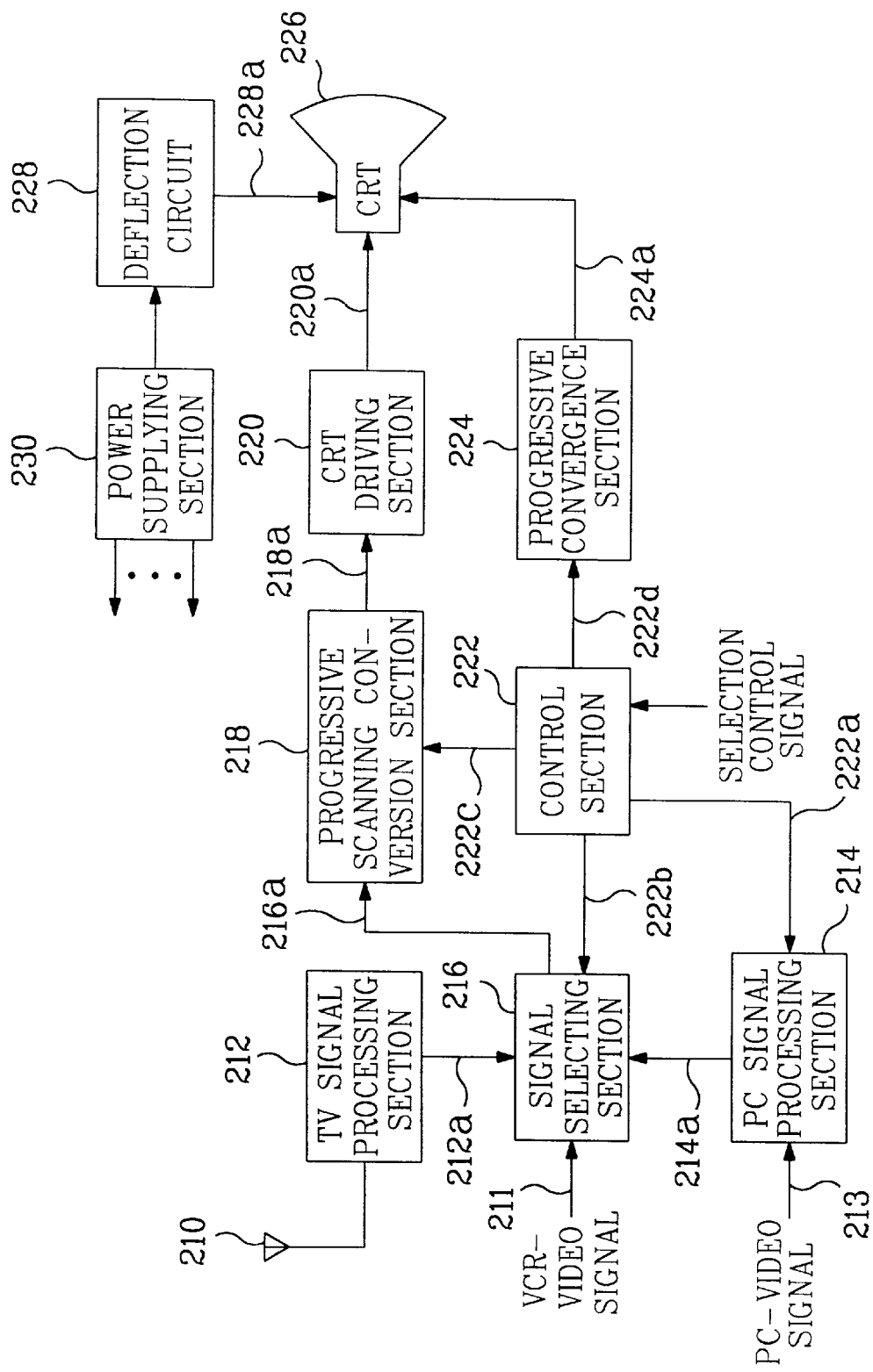
FIG. 2 is a block diagram showing the configuration of a projection type video display apparatus using a progressive scanning mode according to a second embodiment of the present invention.

FIG. 2 is a block diagram showing the configuration of a projection type video display apparatus using a progressive scanning mode according to a second embodiment of the present invention.

Referring to FIG. 2, the projection type video display apparatus using the progressive scanning mode according to the second embodiment of the present invention has a television signal processing section 212 connected to antenna 210, a compute or PC signal processing section 214, a signal selecting section 216, a progressive scanning conversion section 218, a CRT driving section 220, a control section 222, a progressive convergence section 224, a cathode-ray tube 226, a deflection circuit 228, and a power supplying section 230. In this embodiment, television signal processing section 212, progressive scanning conversion section 218, CRT driving section 220, progressive convergence section 224, cathode-ray tube 226, deflection circuit 228 and power supplying section 230 execute operations which are identical to the operations of the corresponding elements in the projection type video display apparatus using the progressive scanning mode according to the first embodiment of the present invention, as described above.

Firstly, when the RF signal is received via an antenna 210, television signal processing section 212 separates television video signal 212a from the RF signal, amplifies television video signal 212a with a tuner, an intermediate-frequency amplifier and a video detector (not shown) installed in television signal processing section 212, and supplies television video signal 212a to signal selecting section 216.

Control section 222 outputs first to fourth control signals 222a, 222b, 222c and 222d, respectively, in response to the selection control signal generated by the user.

Computer (PC) signal processing section 214 is responsive to first control signal 222a, converts a computer video signal 213 inputted from a computer system (not shown) to a video signal 214a of the interlaced scanning mode, and supplies video signal 214a of the interlaced scanning mode to signal selecting section 216.

Signal selecting section 216 receives television video signal 212a, an external (or VCR) video signal 211 and computer video signal 214a from television signal processing section 212, a video cassette recorder or VCR (not shown) and computer signal processing section 214, respectively, and outputs one of television video signal 212a, external video signal 211 and computer video signal 214a, as video signal 216a, in response to second control signal 222b. At this point, video signal 216a outputted from signal selecting section 216 is a video signal of the interlaced scanning mode.

Next, progressive scanning conversion section 218 converts video signal 216a from signal selecting section 216 to video signal 218a of the progressive scanning mode in response to third control signal 222c from control section 222.

CRT driving section 220 amplifies video signal 218a received from progressive scanning conversion section 218, and supplies R-G-B signal 220a to cathode-ray tube 226.

At this point, progressive convergence section 224 responds to fourth control signal 222d from control section 222, and supplies progressive convergence signal 224a to cathode-ray tube 124 in order to minimize the difference between incidence angles of each of the R, G and B components of R-G-B signal 220a outputted from CRT driving section 220.

In addition, deflection circuit 228 supplies H/V deflection signals 228a to cathode-ray tube 226 in order to deflect R-G-B signal 220a, which is supplied from CRT driving section 220 to cathode-ray tube 226, in the horizontal and vertical directions.

Cathode-ray tube 226 is responsive to progressive convergence signal 224a and H/V deflection signals 228a which are inputted from progressive convergence section 224 and deflection circuit 228, respectively, and displays R-G-B signal 220a from CRT driving section 220 in accordance with minimization of the difference between the incidence angles of each of the R, G and components of R-G-B signal 220a.

Figure 3:
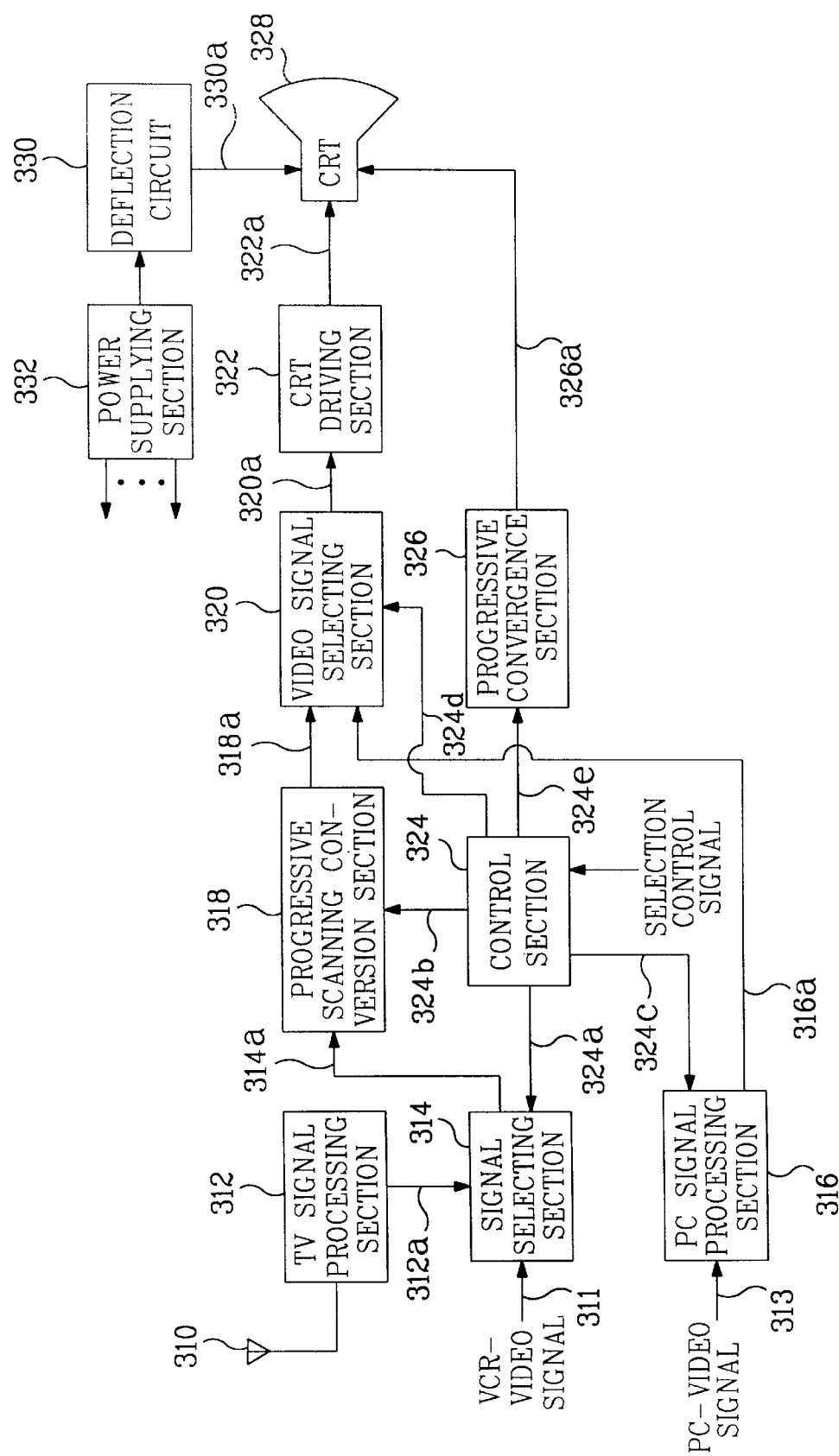
FIG. 3 is a block diagram showing the configuration of a projection type video display apparatus using a progressive scanning mode according to a third embodiment of the present invention.

FIG. 3 is a block diagram showing the configuration of a projection type video display apparatus using a progressive scanning mode according to a third embodiment of the present invention.

Referring to FIG. 3, the projection type video display apparatus using the progressive scanning mode according to the third embodiment of the present invention has a television signal processing section 312 connected to an antenna 310, a signal selecting section 314, a computer signal processing section 316, a progressive scanning conversion section 318, a video signal selecting section 320, a CRT driving section 322, a control section 324, a progressive convergence section 326, a cathode-ray tube 328, a deflection circuit 330, and a power supplying section 332. In this embodiment, television signal processing section 312, signal selecting section 314, progressive scanning conversion section 318, CRT driving section 322, progressive convergence section 326, cathode-ray tube 328, deflection circuit 330 and power supplying section 332 execute operations which are identical to the operations of the corresponding elements of the projection type video display apparatus using the progressive scanning mode according to the first embodiment of the present invention, as described above.

Control section 324 outputs first to fifth control signals 324a, 324b, 324c, 324d and 124e, respectively, in response to the selection control signal generated by the user.

When the RF signal is received via antenna 310, television signal processing section 312 separates television video signal 312a from the RF signal, amplifies television video signal 312a with a tuner, an intermediate-frequency amplifier and a video detector (not shown) installed in television signal processing section 312, and supplies television video signal 312a to signal selecting section 314.

Signal selecting section 314 receives television video signal 312a and an external (or VCR) video signal 311 from television signal processing section 312 and a video cassette recorder or VCR (not shown), respectively, and outputs one of television video signal 312a and external video signal 311, as a first video signal 314a, in response to first control signal 324a. At this point, first video signal 314a outputted from signal selecting section 314 is a video signal of the interlaced scanning mode.

Computer (PC) signal processing section 316 is responsive to third control signal 324c, converts a computer video signal 313 inputted from a computer system (not shown) to a second video signal 316a of the progressive scanning mode, and supplies second video signal 316a of the progressive scanning mode to video signal selecting section 320.

Next, progressive scanning conversion section 318 responds to second control signal 324b from control section 324, converts first video signal 314a from signal selecting section 314 to third video signal 318a of the progressive scanning mode, and outputs third video signal 318a.

Video signal selecting section 320 receives second and third video signals 316a and 318a, respectively, from computer signal processing section 316 and progressive scanning conversion section 318, respectively, and supplies one of the second and third video signals 316a and 318a, respectively, as fourth video signal 320a, to CRT driving section 322 in response to fourth control signal 324d.

CRT driving section 322 amplifies fourth video signal 320a inputted from video signal selecting section 320, and supplies R-G-B signal 322a to cathode-ray tube 328.

At this point, progressive convergence section 326 is responsive to fifth control signal 324e from control section 324, and supplies progressive convergence signal 326a to cathode-ray tube 328 in order to minimize the difference between the incidence angles of each of the R, G and B components of R-G-B signal 322a outputted from CRT driving section 322.

In addition, deflection circuit 330 supplies HN deflection signals 330a to cathode-ray tube 328 in order to deflect R-G-B signal 322a, which is supplied from CRT driving section 322 to cathode-ray tube 328, in the horizontal and vertical directions.

Cathode-ray tube 328 is responsive to progressive convergence signal 326a and H/V deflection signals 330a, which are inputted from progressive convergence section 326 and deflection circuit 330, respectively, and displays R-G-B signal 322a from CRT driving section 322 in accordance with minimization of the difference between the incidence angles of each of R, G and B components of R-G-B signal 322a.

In the projection type video display apparatus according to the present invention, as described above, the video signal of the interlaced scanning mode inputted from the external system (such as the video cassette recorder or computer system) is displayed after the scanning mode is converted to the progressive scanning mode. Accordingly, it is able to prevent the resolution of the screen from decreasing.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A projection type video display apparatus using a progressive scanning mode, said apparatus comprising:

signal selecting means for receiving a plurality of video signals from external sources, and for selectively outputting one of the plurality of video signals in response to a first control signal;

progressive scanning conversion means connected to an output of said signal selecting means for converting said selectively outputted one of the plurality of video signals from said signal selecting means to a video signal of the progressive scanning mode in response to a second control signal;

cathode-ray tube driving means for amplifying the video signal of the progressive scanning mode from said progressive scanning conversion means to output a red-green-blue signal having red, green and blue components;

progressive convergence means responsive to a third control signal for outputting a progressive convergence signal so as to minimize a difference between incidence angles of each of the red, green and blue components of the red-green-blue signal outputted from said cathode-ray tube driving means;

cathode-ray tube means for outputting the red-green-blue signal from said cathode-ray tube driving means to a user in response to the progressive convergence signal; and control means for supplying the first control signal to said signal selecting means in response to a selection control signal from the user in order to select the video signal, for supplying the second control signal to said progressive scanning conversion means in order to convert said selectively outputted one of the plurality of video signals from said signal selecting means to the video signal of the progressive scanning mode, and for supplying the third control signal to said progressive convergence means.

2. The apparatus as claimed in claim 1, wherein the plurality of video signals comprises a video signal separated from a television signal received from an external source and a video signal received from a video cassette recorder.

3. The apparatus as claimed in claim 1, wherein said apparatus further comprises a television signal processing means for receiving a television signal, for separating a video signal from the television signal, for amplifying the separated video signal, and for supplying the amplified separated video signal to said signal selecting means.

4. The apparatus as claimed in claim 1, wherein said apparatus further comprises:

television signal processing means for receiving a television signal, for separating a video signal from the television signal, for amplifying the separated video signal, and for supplying the amplified separated video signal to said signal selecting means; and computer signal processing means for receiving a computer video signal from a computer system, for converting the computer video signal to a video signal of an interlaced scanning mode in response to a fourth control signal received from said control means, and for supplying the video signal of the interlaced scanning mode to said signal selecting means.

5. The apparatus as claimed in claim 1, wherein the plurality of video signals comprises a video signal received from a computer system and one of a video signal separated from a television signal and a video signal received from a video cassette recorder.

6. The apparatus as claimed in claim 1, wherein said progressive convergence means has an input connected to said control means and an output connected to said cathode-ray tube means.

7. A projection type video display apparatus using a progressive scanning mode, said apparatus comprising:

signal selecting means for receiving a plurality of video signals from external sources, wherein the plurality of video signals comprises a video signal separated from a television signal, a video signal received from a video cassette recorder, and a video signal received from a computer system, and for selectively outputting one of the plurality of video signals in response to a first control signal;

progressive scanning conversion means connected to an output of said signal selecting means for converting said selectively outputted one of the plurality of video signals from said signal selecting means to a video signal of the progressive scanning mode in response to a second control signal;

cathode-ray tube driving means for amplifying the video signal of the progressive scanning mode from said progressive scanning conversion means to output a red-green-blue signal having red, green and blue components;

progressive convergence means responsive to a third control signal for outputting a progressive convergence signal so as to minimize a difference between incidence angles of each of the red, green and blue components of the red-green-blue signal outputted from said cathode-ray tube driving means;

cathode-ray tube means for outputting the red-green-blue signal from said cathode-ray tube driving means to a user in response to the progressive convergence signal; and control means for supplying the first control signal to said signal selecting means in response to a selection control signal from the user in order to select the video signal, for supplying the second control signal to said progressive scanning conversion means in order to convert said selectively outputted one of the plurality of video signals from said signal selecting means to the video signal of the progressive scanning mode, and for supplying the third control signal to said progressive convergence means.

8. The apparatus as claimed in claim 7, wherein said progressive convergence means has an input connected to said control means and an output connected to said cathode-ray tube means.

9. A projection type video display apparatus using a progressive scanning mode, said apparatus comprising:

television signal processing means for receiving a television signal, for separating a video signal from the television signal, for amplifying the separated video signal, and for supplying the amplified separated video signal as an output;

computer signal processing means for receiving a computer video signal, and for converting the computer video signal to a video signal of an interlaced scanning mode in response to a first control signal;

signal selecting means for receiving the output of the television signal processing means, the video signal of the interlaced scanning mode and an external video signal, and for selectively outputting one of the output of the television signal processing means, the video signal of the interlaced scanning mode and the external video signal as a video output in response to a second control signal;

progressive scanning conversion means for converting the video output from said signal selecting means to a video signal of a progressive scanning mode in response to a third control signal;

cathode-ray tube driving means for amplifying the video signal of the progressive scanning mode from said progressive scanning conversion means to provide a red-green-blue signal having red, green and blue components;

progressive convergence means, responsive to a fourth control signal, for outputting a progressive convergence signal so as to minimize a difference between incidence angles of each of the red, green and blue components of the red-green-blue signal outputted from said cathode-ray tube driving means;

cathode-ray tube means for outputting the red-green-blue signal from said cathode-ray tube driving means to a user in response to the progressive convergence signal; and control means for supplying the first control signal to said computer signal processing means in order to convert the computer video signal to the video signal of the interlaced scanning mode, for supplying the second control signal to said signal selecting means in order to selectively output one of the output of the television signal processing means, the video signal of the interlaced scanning mode and the external video signal in response to a selection control signal from the user, for supplying the third control signal to said progressive scanning conversion means in order to convert the video output from said signal selecting means to the video signal of the progressive scanning mode, and for supplying the fourth control signal to said progressive convergence means.

10. The apparatus as claim 9, wherein said progressive convergence means has an input connected to said control means and an output connected to said cathode-ray tube means.

11. A projection type video display apparatus using a progressive scanning mode, said apparatus comprising:

signal selecting means for receiving a plurality of video signals from external sources, and for selectively outputting one of the plurality of video signals in response to a first control signal;

progressive scanning conversion means for converting said selectively outputted one of the plurality of video signals from said signal selecting means to a video signal of the progressive scanning mode in response to a second control signal;

computer signal processing means for receiving a computer video signal, and for converting the computer video signal to a video signal of the progressive scanning mode in response to a third control signal;

video signal selecting means responsive to a fourth control signal for outputting one of the video signals of the progressive scanning mode from said progressive scanning conversion means and said computer signal processing means, respectively, to provide a video output;

cathode-ray tube driving means for amplifying the video output from said video signal selecting means to provide a red-green-blue signal having red, green and blue components;

progressive convergence means responsive to a fifth control signal for outputting a progressive convergence signal to minimize a difference between incidence angles of each of the red, green and blue components of the red-green-blue signal provided by said cathode-ray tube driving means;

cathode-ray tube means for outputting the red-green-blue signal from said cathode-ray tube driving means to a user in response to the progressive convergence signal; and control means for supplying the first control signal to said signal selecting means in response to a selection control signal from the user, for supplying the second control signal to said progressive scanning conversion means in order to convert the video output from said signal selecting means to the video signal of the progressive scanning mode, for supplying the third control signal to said computer signal processing means in order to convert the computer video signal to the video signal of the progressive scanning mode, for supplying the fourth control signal to said video signal selecting means in order to select one of the video signal of the progressive scanning mode and the computer video signal from said progressive, scanning conversion means and said computer signal processing means, respectively, and for supplying the fifth control signal to said progressive convergence means.

12. The apparatus as claimed in claim 11, wherein the plurality of video signals comprises a video signal separated from a television signal and a video signal inputted from a video cassette recorder.

13. The apparatus as claimed in claim 11, wherein said progressive convergence means has an input connected to said control means and an output connected to said cathode-ray tube means.

14. A projection type video display apparatus using a progressive scanning mode, said apparatus comprising:

signal selecting means for receiving a plurality of video signals, and for selectively outputting one of the plurality of video signals in response to a first control signal;

progressive scanning conversion means connected to an output of said signal selecting means for converting said selectively outputted one of the plurality of video signals from said signal selecting means to a video signal of the progressive scanning mode in response to a second control signal;

cathode-ray tube driving means for amplifying the video signal of the progressive scanning mode from said progressive, scanning conversion means to output a red-green-blue signal;

cathode-ray tube means responsive to the red-green-blue signal from said cathode-ray tube driving means for producing a display; and control means responsive to a selection control signal from a user for supplying the first control signal to said signal selecting means, and for supplying the second control signal to said progressive scanning conversion means.

15. The apparatus as claimed in claim 14, further comprising progressive convergence means connected between said control means and said cathode-ray tube means, and responsive to a third control signal from said control means for providing a progressive convergence signal to said cathode-ray tube means so as to minimize a difference between incidence angles of each of red, green and blue components of said red-green-blue signal outputted from said cathode-ray tube driving means.

16. The apparatus as claimed in claim 14, further comprising television signal processing means for receiving a television signal, for separating a video signal from the television signal, for amplifying the separated video signal, and for supplying the amplified separated video signal to said signal selecting means.

17. The apparatus as claimed in claim 14, wherein the plurality of video signals comprises a video signal received from a computer system and one of a video signal separated from a television signal and a video signal received from a video cassette recorder.

18. The apparatus as claimed in claim 14, wherein said progressive convergence means has an input connected to said control means and an output connected to said cathode-ray tube means.

19. A projection type video display apparatus using a progressive scanning mode, said apparatus comprising:

signal selecting means for receiving a plurality of video signals, and for selectively outputting one of the plurality of video signals in response to a first control signal;

progressive scanning conversion means for converting said selectively outputted one of the plurality of video signals from said signal selecting means to a video signal of the progressive scanning mode in response to a second control signal;

additional signal selecting means responsive to a third control signal for selecting between the video signal of the progressive scanning mode and another signal to provide a selection output;

cathode-ray tube driving means for amplifying the selection output of the additional signal selecting means to output a red-green-blue signal;

cathode-ray tube means responsive to the red-green-blue signal from said cathode-ray tube driving means for producing a display; and control means responsive to a selection control signal from a user for supplying the first control signal to said signal selecting means, and for supplying the second control signal to said progressive scanning conversion means and the third control signal to said additional signal selecting means;

said apparatus further comprising computer signal processing means for receiving a computer video signal from a computer system, for converting the computer video signal to a video signal of an interlaced scanning mode in response to a fourth control signal received from said control means, and for supplying the video signal of the interlaced scanning mode to said additional signal selecting means.

20. A projection type video display apparatus using a progressive scanning mode, said apparatus comprising:

signal selecting means for receiving a plurality of video signals, and for selectively outputting one of the plurality of video signals in response to a first control signal;

progressive scanning conversion means for converting said selectively outputted one of the plurality of video signals from said signal selecting means to a video signal of the progressive scanning mode in response to a second control signal;

additional signal selecting means responsive to a third control signal for selecting between the video signal of the progressive scanning mode and another signal to provide a selection output;

cathode-ray tube driving means for amplifying the selection output of the additional signal selecting means to output a red-green-blue signal;

cathode-ray tube means responsive to the red-green-blue signal from said cathode-ray tube driving means for producing a display; and control means responsive to a selection control signal from a user for supplying the first control signal to said signal selecting means, for supplying the second control signal to said progressive scanning conversion means, and for supplying the third control signal to said additional signal selecting means;

said apparatus further comprising computer signal processing means for receiving a computer video signal, for converting the computer video signal to a video signal of the progressive scanning mode in response to a third control signal from said control means, and for providing the video signal of the progressive scanning mode to said additional signal selecting means.

21. The apparatus as claimed in claim 20, further comprising video signal selecting means connected between said computer signal processing means and said cathode-ray tube driving means, and responsive to a fourth control signal from said control means for selectively outputting one of the video signals of the progressive scanning mode from said progressive scanning conversion means and said computer signal processing means, respectively.

22. The apparatus as claimed in claim 21, wherein said cathode-ray tube driving means amplifies an output of said video signal selecting means to provide the red-green-blue signal.

23. The apparatus as claimed in claim 22, wherein said red-green-blue signal has red, green and blue components, said apparatus further comprising progressive convergence means responsive to a fifth control signal from said control means for outputting a progressive convergence signal to minimize a difference between incidence angles of each of the red, green and blue components of the red-green-blue signal provided by said cathode-ray tube driving mean, and wherein said cathode-ray tube means is responsive to the progressive convergence signal for producing said display.

\* \* \* \* \*